(12) United States Patent
Faraldi et al.

(10) Patent No.: US 12,025,318 B2
(45) Date of Patent: Jul. 2, 2024

(54) HOUSEHOLD APPLIANCE

(71) Applicant: ELECTROLUX APPLIANCES AKTIEBOLAG, Stockholm (SE)

(72) Inventors: Paolo Faraldi, Forli (IT); Marco Carnevali, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 1064 days.

(21) Appl. No.: 16/468,835

(22) PCT Filed: Nov. 24, 2017

(86) PCT No.: PCT/EP2017/080340
§ 371 (c)(1),
(2) Date: Jun. 12, 2019

(87) PCT Pub. No.: WO2018/114217
PCT Pub. Date: Jun. 28, 2018

(65) Prior Publication Data
US 2020/0072476 A1 Mar. 5, 2020

(30) Foreign Application Priority Data
Dec. 21, 2016 (EP) .................................... 16205833

(51) Int. Cl.
*A21B 3/04* (2006.01)
*A47J 27/04* (2006.01)
(Continued)

(52) U.S. Cl.
CPC .............. *F24C 15/327* (2013.01); *A21B 3/04* (2013.01); *A47J 27/04* (2013.01); *F22B 1/284* (2013.01)

(58) Field of Classification Search
CPC .......... F24C 15/327; A21B 3/04; A47J 27/04; F22B 1/284; F16L 11/115
(Continued)

(56) References Cited

U.S. PATENT DOCUMENTS 3,861,424 A * 1/1975 Mizutani ................ F16L 11/112
138/119
4,860,791 A * 8/1989 Putnam ..................... F16L 5/00
285/903
(Continued)

FOREIGN PATENT DOCUMENTS

DE 102004060709 A1 6/2006
DE 102011053950 A1 3/2013
(Continued)

OTHER PUBLICATIONS

International Search Report and Written Opinion in PCT/EP2017/080340 dated Feb. 16, 2018 (10 pages).

*Primary Examiner* — Helena Kosanovic
*Assistant Examiner* — Tiffany T Tran
(74) *Attorney, Agent, or Firm* — Pearne & Gordon LLP

(57) ABSTRACT

The invention relates to a household appliance comprising a liquid receiving entity (2) for storing liquid, a liquid port (3) for supplying liquid to the liquid receiving entity (2) and a coupling element (4) adapted to provide a liquid connection between the liquid receiving entity (2) and the liquid port (3), the coupling element (4) comprising a U-shape or essentially a U-shape with a first and a second leg portion (4.1, 4.2) and a curved portion (4.3) connecting the first and the second leg portion (4.1, 4.2), wherein the coupling element (4) comprises at least one flexible section and wherein at least one leg portion (4.1, 4.2) comprises stiffening means (5) for stiffening the leg portion (4.1, 4.2).

18 Claims, 3 Drawing Sheets

(51) Int. Cl.
*F22B 1/28* (2006.01)
*F24C 15/32* (2006.01)

(58) Field of Classification Search
USPC .......................................... 219/401; 138/106
See application file for complete search history.

(56) References Cited

U.S. PATENT DOCUMENTS

| | | | | |
|---|---|---|---|---|
| 8,875,547 | B2* | 11/2014 | Suzuki | D06F 35/001 |
| | | | | 68/12.13 |
| 9,211,847 | B1* | 12/2015 | Cox | B60R 15/00 |
| 9,648,983 | B2* | 5/2017 | Höfer | A47J 31/542 |
| 9,801,487 | B2* | 10/2017 | Park | A47J 27/04 |
| 10,822,780 | B2* | 11/2020 | Sumner | E03C 1/28 |
| 2008/0148959 | A1* | 6/2008 | Bockbrader | A47J 31/402 |
| | | | | 99/323.3 |
| 2009/0133769 | A1* | 5/2009 | Riley | B32B 1/08 |
| | | | | 138/132 |
| 2010/0206175 | A1* | 8/2010 | White | A47J 31/4457 |
| | | | | 99/280 |
| 2010/0221394 | A1* | 9/2010 | Gaulard | F24H 9/2028 |
| | | | | 392/471 |
| 2013/0087049 | A1* | 4/2013 | White | A47J 31/0605 |
| | | | | 99/283 |
| 2014/0050464 | A1* | 2/2014 | Lin | F24H 1/142 |
| | | | | 392/478 |
| 2015/0114045 | A1 | 4/2015 | Bolduan et al. | |
| 2015/0128815 | A1* | 5/2015 | Lin | A47J 31/465 |
| | | | | 99/302 P |
| 2016/0007797 | A1* | 1/2016 | Lin | A47J 31/46 |
| | | | | 99/295 |

FOREIGN PATENT DOCUMENTS

EP   2649881 A1   10/2013
EP   2703739 A1   3/2014

* cited by examiner

HOUSEHOLD APPLIANCE

The present invention relates generally to the field of household appliances. More specifically, the present invention is related to a household appliance with a liquid receiving entity which is coupled with a liquid port via a U-shaped coupling element.

BACKGROUND OF THE INVENTION

Steam ovens, respectively steam ranges are a special kind of appliances that can deliver controlled quantities of steam to drive/assist cooking cycles. Steam is usually produced during cooking cycles by a dedicated generation system, which can be fit outside or inside the cavity. In particular, external generators produce steam outside the cavity and convey it into the cavity itself through a duct.

Several types of electrically heated generators are available on the market: heated pipes and thermo-blocks are among the most popular, due to cost and flexibility of use. In general, a key feature for all most recent steam generators is the relatively small volume available for water to be vaporized: this allows high efficiency and a rapid response in terms of steam generation upon heating. On the other hand, this approach requires storage of water in a different component/location with respect to the generator itself, hence a dedicated pipework system to convey water from the reservoir, respectively, steam to the oven cavity.

Even if solutions are known with a direct connection to water line to procure water to be evaporated, the majority of known applications rely on a storage unit, where water is stored to be sent upon need to the steam generation system. Such storage reservoir has to be located where enough volume is available. Filling of the water reservoir happens necessarily through an accessible opening or liquid port, which has to be conveniently located to be easily reached and operated. The main control dashboard is one of the preferred options, for a matter of physical and cognitive ergonomics.

As the location and the fixture of reservoir and water port are very often different, the connection between the two elements can be a challenge, especially in terms of assembly process. In particular, reservoirs are typically located inside the technical volumes of the appliance, in a relatively early stage of assembly process, while the dashboard, hence the water port, is typically mounted in a subsequent step.

SUMMARY OF THE INVENTION

It is an objective of embodiments of the present invention to provide a household appliance comprising a liquid port arranged at a distance to a liquid receiving entity which can be assembled with reduced effort. If not explicitly indicated otherwise, embodiments of the invention can be freely combined with each other.

According to an aspect, the invention relates to a household appliance comprising a liquid receiving entity for storing liquid, a liquid port for supplying liquid to the liquid receiving entity and a coupling element adapted to provide a liquid connection between the liquid receiving entity and the liquid port. The coupling element comprises a U-shaped or essentially a U-shaped pipe with a first and a second leg portion and a curved portion connecting the first and the second leg portion. The coupling element comprises at least one flexible section and at least one leg portion comprises stiffening means for stiffening the leg portion.

The main advantage of the present invention is that the household appliance can be manufactured with reduced effort because the coupling element can be extended (due to the U-shape) during the manufacturing process and recovers into its required shape, specifically its required slope after finishing the assembling process.

According to preferred embodiments, said stiffening means comprise a rib structure. Said rib structure may comprise one or more ribs or webs radially protruding from the wall of the tubular-shaped coupling element. The rib structure may preferably not extend along the whole length of the coupling element but may be only provided at certain portions. Specifically, the rib structure is broken in the area of said one or more flexible sections. Thereby, the stability of the coupling element can be increased in certain sections.

According to preferred embodiments, said rib structure extends in flow direction along the coupling element. Preferably, the rib structure may comprise a single rib which extends along the coupling element.

According to preferred embodiments, said rib structure may extend downwardly from said coupling element. Preferably, the rib structure may comprise a rib which is arranged in a vertical or essentially a vertical oriented plane. Thereby, the rib structure provides one or more support portions by which the coupling element is supported. Preferably, the coupling element rests on the liquid receiving entity by means of said rib structure. So, the rib structure does not only provide a stabilizing effect but also bases the coupling element at a supporting surface.

According to preferred embodiments, said stiffening means are adapted to define portions with increased rigidity. During the assembly process, the coupling element may be deformed. Said deformation can be controlled by said stiffening means by defining areas of the coupling element which can be bent (areas in which no stiffening means are provided) and more rigid areas (areas in which stiffening means are provided) which can not or essentially not be bent. Thereby the deformation behaviour of the coupling element can be controlled. More in detail, said stiffening means may reduce flexibility in certain areas of the coupling element in order to concentrate the deformation (e.g. during the assembling process) in certain areas (e.g. curved portions of the coupling element). An increase rigidity based on said stiffening means is useful also to grant straightness of a certain portion of the coupling element and keep its inclination as constant as possible in order to avoid kinks and stagnant water.

According to preferred embodiments, said stiffening means are adapted to define a certain inclination of the coupling element with respect to a horizontal plane. The stiffening means, specifically the rib structure may comprise a decreasing height (with respect to the flow direction). Thereby, a slope of the coupling element is achieved when positioning the coupling element at a horizontal support portion. This effects the desired liquid flow towards the liquid receiving entity.

According to preferred embodiments, the coupling element is adapted to rest on the liquid receiving entity, wherein said stiffening means ensure a desired angle of inclination of the coupling element with respect to the upper surface of the liquid receiving entity. Thereby, the coupling element can be coupled with a liquid port in a deformed state (similarly to a harnessing process of the dashboard) and may then automatically restore to its original shape (U-shape) thereby resting at the liquid receiving entity and being positioned in the desired slope.

According to preferred embodiments, the coupling element comprises a fixing portion adapted to interact, specifically rest against a corresponding mounting portion of the household appliance after the assembling process. The mounting portion may be, for example, a wall portion or a panel which comprises an opening for providing a passage for the coupling element. the diameter or cross section of the fixing portion is greater than the opening provided within the mounting portion. Thereby the fixing portion provides a stop or seal when abutting against the mounting portion after restoring into its original shape (U-shape).

According to preferred embodiments, the fixing portion radially protrudes from the coupling element, specifically from a leg portion of the coupling element. Said fixing portion may be arranged in close proximity to the first coupling portion of the coupling element. For example, said fixing portion may comprise a disk-like shape.

According to preferred embodiments, the curved portion comprises stiffening means, specifically a rib structure for increased rigidity of the curved portion. Said stiffening means may be adapted to define a certain inclination of the curved portion with respect to a horizontal plane. Said rib structure may extend downwardly from said coupling element. Preferably, said stiffening means may comprise a rib which is arranged in a vertical or essentially a vertical oriented plane. Thereby, the rib structure provides one or more support portions by which the curved portion is supported. Preferably, the curved portion rests on the liquid receiving entity by means of said rib structure. So, the rib structure does not only provide a stabilizing effect but also bases the curved portion at a supporting surface.

According to embodiments, the coupling element comprises one or more connection portions, in the following also referred to as fixation means, adapted to fix the coupling element at the upper surface of the liquid receiving entity. Thereby, the coupling element can be additionally secured at the liquid receiving entity.

According to embodiments, the coupling element may comprise a collar being arranged at a certain distance of the fixing portion. Said collar and said fixing portion may be arranged at different positions of the first leg portion. Said collar may comprise a greater width or cross section than the fixing portion in order to limit the deformation of the coupling element when abutting against the mounting portion.

According to preferred embodiments, when deforming the coupling element, the at least one flexible section is adapted to provide a hinge portion and said stiffening means specify more rigid portions thereby defining a certain deformation pattern. In other words, due to the spatial arrangement of flexible sections and stiffening means, the coupling element can be deformed during the assembly process without occurrence of any kinks or sharp bends.

According to preferred embodiments, the coupling element is adapted to recover into a desired shape after deformation. In other words, at least the flexible sections may comprise an elastic material which effect restoring forces such that the coupling element returns into its original shape. Said restoring may be supported by the assembly process and the arrangement of the liquid port at a certain position of the household appliance.

According to preferred embodiments, the liquid receiving entity is a liquid tank, specifically a water tank. Said liquid tank may build a liquid reservoir for a liquid used within the household appliance, specifically for generating steam in a steam oven. So, according to embodiments of the present invention, the household appliance may be configured as a steam oven.

The term "essentially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
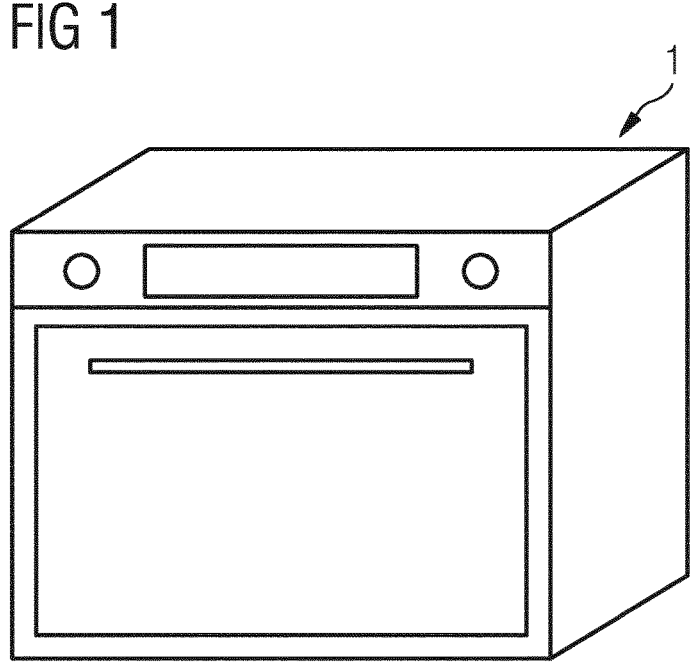
FIG. 1 shows an example schematic view of a household appliance.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 shows a schematic illustration of a household appliance 1 constituted by a steam oven. Such steam oven may comprise a liquid receiving entity 2, specifically a water tank and a liquid port 3 for providing liquid, specifically water to said liquid receiving entity 2. For fluidly coupling the liquid port 3 with the liquid receiving entity 2, a coupling element 4 is provided which may be formed by a pipe section.

Figure 2:
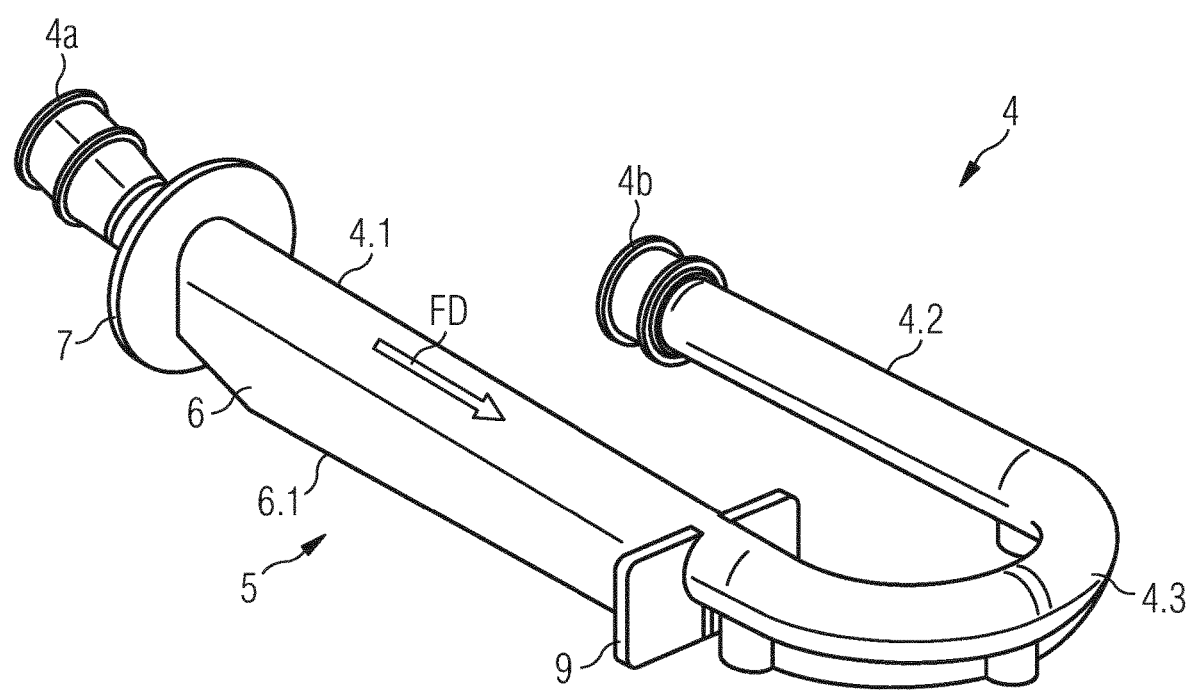
FIG. 2 shows an example perspective view of a coupling element.
Figure 3:
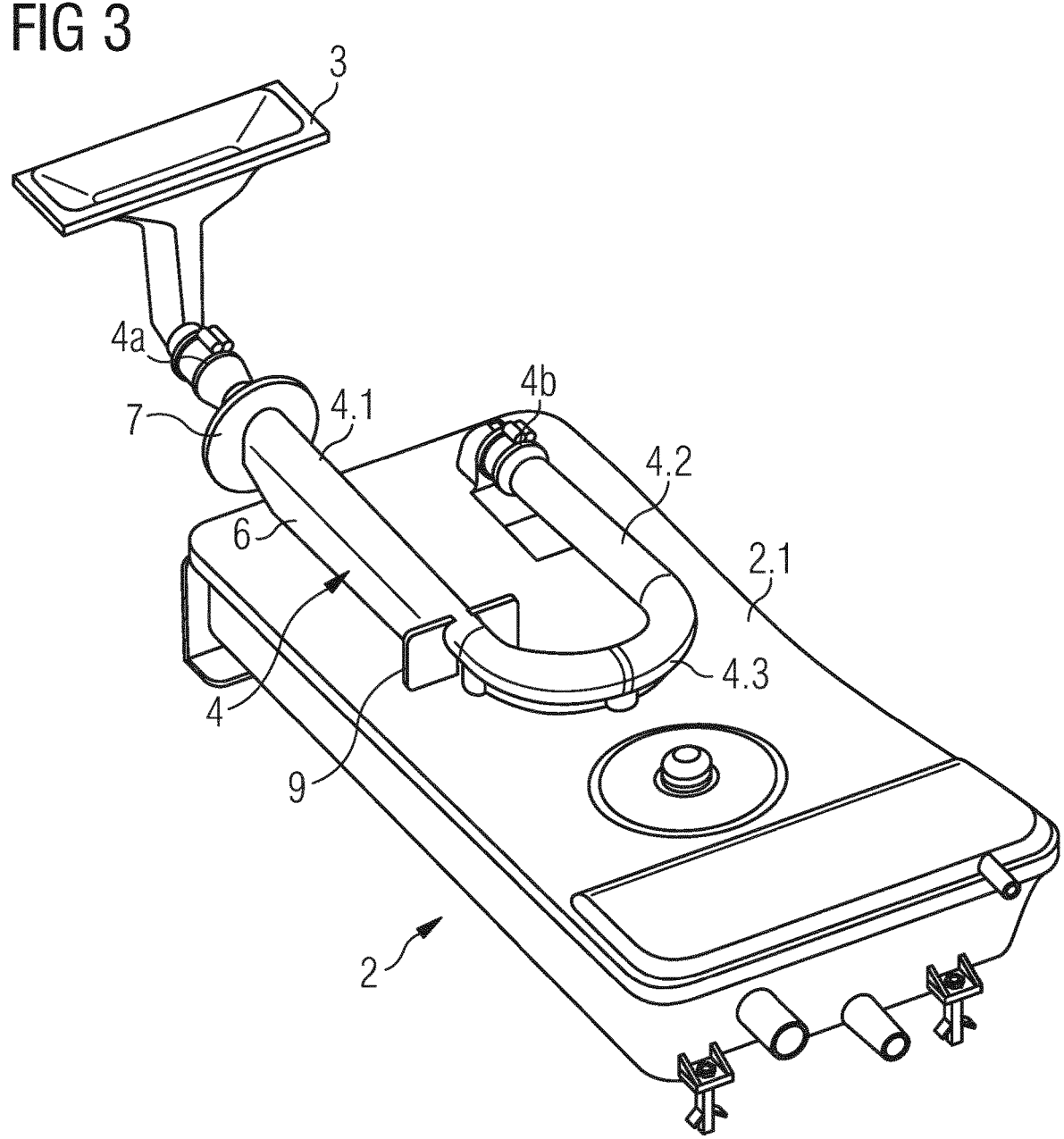
FIG. 3 shows a liquid receiving entity connected with a coupling element.
Figure 4:
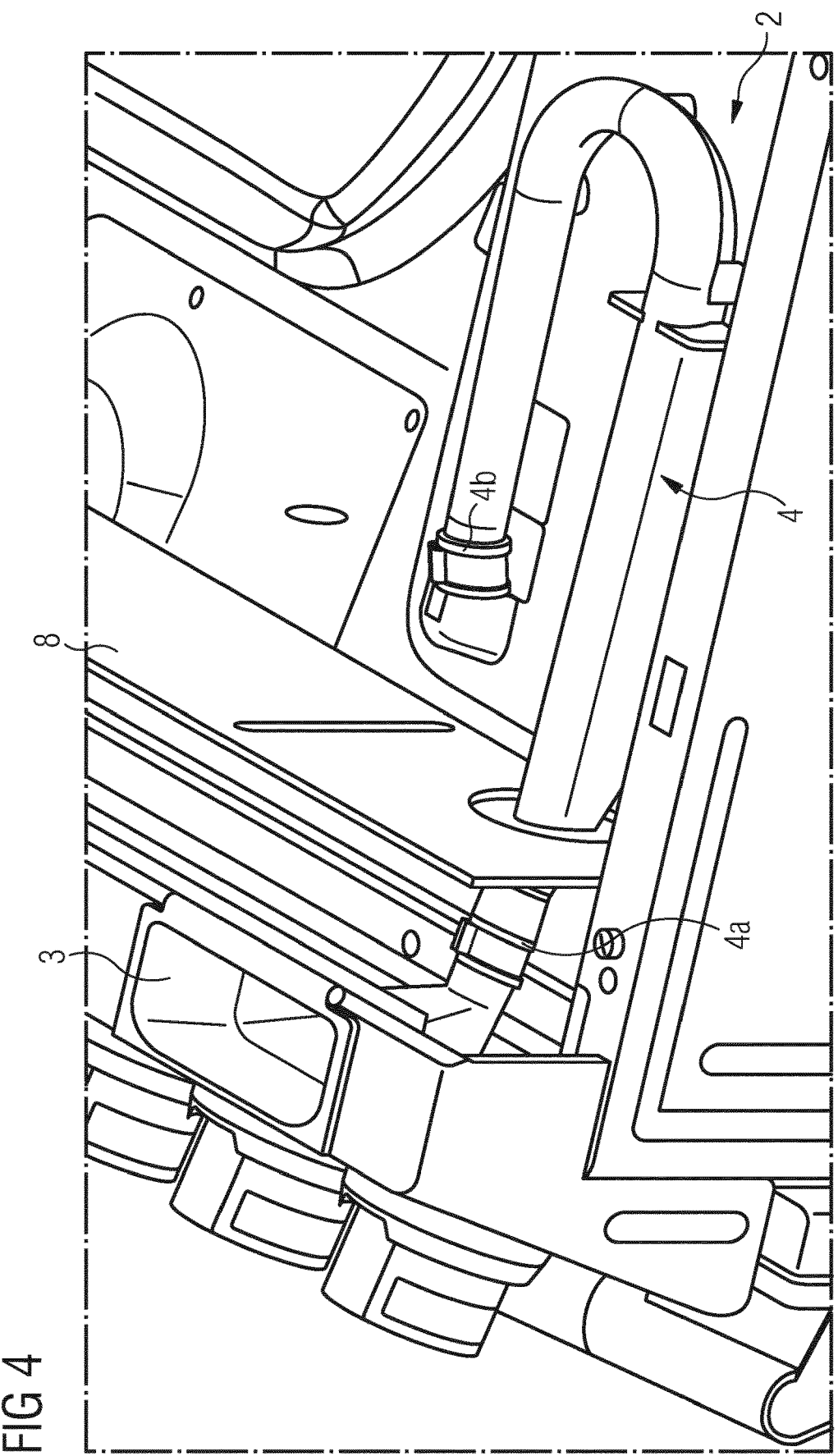
FIG. 4 shows the liquid receiving entity and the coupling element arranged within the household appliance.

FIGS. 2 to 4 show a coupling element 4 which is adapted to couple a liquid receiving entity 2, specifically a liquid or water tank with a liquid port 3. The liquid port 3 is configured to provide a liquid supply opening through which liquid, specifically water can be filled into the liquid receiving entity 2. The coupling element 4 is provided between the liquid port 3 and the liquid receiving entity 2. A first end of the coupling element 4 is coupled with the liquid port 3 and a second end of the coupling element 4 is coupled with the liquid receiving entity 2. Thereby liquid provided to the liquid port 3 can flow through the coupling element 4 into the liquid receiving entity 2. According to embodiments, the liquid port 3 may have a funnel shape.

More in detail, the coupling element 4 may comprise a U-shaped or essentially U-shaped pipe. The coupling element 4 may comprise a first and a second leg portion 4.1, 4.2 which may be arranged essentially in parallel to each other (in the assembled state) and a curved portion 4.3 connecting said leg portions 4.1, 4.2. The coupling element 4 comprises a first coupling portion 4a and a second coupling portion 4b. Said first coupling portion 4a may be adapted to connect the coupling element 4 with the liquid port 3. Said second coupling portion 4b may be adapted to connect the coupling element 4 with the liquid receiving entity 2. According to further embodiments, the first and the second leg portion 4.1, 4.2 may have a different length. Preferably, the first leg portion 4.1 may be configured longer than the second leg portion 4.2. Thereby, liquid can be supplied to the liquid port 3 at a position which is accessible at the peripheral of the household appliance 1 wherein the liquid receiving entity 2 is arranged in the interior of the appliance.

In order to be able to ease the manufacturing process of the household appliance 1, the coupling element 4 does not provide a direct connection between the liquid port 3 and the liquid receiving entity 2 but is adapted to form a U-shaped loop in the assembled state. In other words, the coupling element 4 provides excess length in order to be able to connect the coupling element 4 with the liquid receiving entity 2, arrange a covering entity, e.g. an upper hob portion above the liquid receiving entity 2 such that the liquid receiving entity 2 is covered and than coupling the liquid port 3 with the first coupling portion 4a. During the assembly process, the coupling element 4 can be deformed, e.g. pulled out of the household appliance 1 and the coupling element 4 is adapted to revert into its original shape after finishing the assembly process.

In order to be able to deform the coupling element 4, the coupling element 4 comprises one or more flexible sections. For example, a flexible section may be the second coupling portion 4b and the second leg portion 4.2. The flexible section(s) act as hinges at which the coupling element 4 can be bent. Preferably, said bending may be only performed once in the lifetime, namely during assembling process or in case of service of the control panel which may comprise the liquid port 3.

In order to ensure that the coupling element 4 ends up with the desired shape and slope after the assembly process, stiffening means 5 are provided at the coupling element 4. Stiffening means 5 may be any reinforcements which can be used to increase the stability of the coupling element 4. Specifically, said stiffening means 5 may be arranged at straight portions of the coupling element 4, e.g. the first leg portion 4.1 in order to ensure that said straight portions stay straight or essentially straight when applying external forces to the coupling element 4 during the assembly process. However, such stiffening means 5 can also be provided at the second leg portion 4.2, respectively, the curved portion 4.3.

More in detail, said stiffening means 5 may comprise a rib structure 6. Said rib structure 6 may be a linear rib structure, i.e. the rib structure 6 may comprise a single web which extends along the flow direction FD of the liquid passing the coupling element 4. According to other embodiments, the rib structure 6 may comprise a spiral shape. Said rib structure 6 may preferably protrude at the bottom side of the coupling element 4. Said rib structure 6 may not only provide a mechanical reinforcement but may also provide a support for the coupling element 4. The rib structure 6 may comprise a free end portion 6.1 which is adapted to arrange the coupling element 4 in a slanted position in order to enable the liquid to flow from the first coupling portion 4a to the second coupling portion 4b. In other words, the rib structure 6 provides a desired slope of the segments of the coupling element 4 in order to ensure a smooth liquid flow and avoiding any kinks and unwanted dead corners which may lead to liquid stagnation.

Said stiffening means 5 may be integrally formed at the coupling element 4 or may be a separate unit which can be attached to the coupling element 4.

As best seen in FIGS. 2 and 3, the coupling element 4 further comprises a fixing portion 7 which forms a collar at the coupling element 4. Said fixing portion 7 may protrude radially from the coupling element 4. In the present embodiment, said fixing portion 7 is arranged at the first leg portion 4.1 close to the first coupling portion 4a. For example, the fixing portion 7 may comprise a disk-like shape. It should be noted that the fixing portion 7 can also comprise other shapes, e.g. a polygonal shape. Preferably, the fixing portion 7 may be coupled with said stiffening means 5, i.e. the stiffening means 5 may merge into the fixing portion 7.

As shown in FIG. 4, said fixing portion 7 may interact with a mounting portion 8 of the household appliance 1 in order to arrange the coupling element 4 at a certain position. For example, the fixing portion 7 may act as a seal or stop portion when the coupling element 4 is in its nominal position. More specifically, the mounting portion 8 may be a wall portion or panel of the household appliance comprising an opening which provides a passage for the coupling element 4 through the wall portion. Said fixing portion 7 may be flexible in order to be able to push or pull the fixing portion 7 through said opening during the assembling process. The fixing portion 7 may comprise larger dimensions, e.g. a larger diameter than said opening of the mounting portion 8 in order to provide a stop portion when abutting against the edge of the opening provided within the mounting portion 8.

According to embodiments, the coupling element 4 may further comprise a collar 9. Said collar 9 may be arranged at a certain distance to the fixing portion 7 at the first leg portion 4.1. For example, said rib structure 6 may extend between the fixing portion 7 and said further collar 9. Said collar 9 may provide a further stop portion which will limit the deformation of the coupling element 4 when abutting against the opening provided within the mounting portion 8.

FIG. 4 illustrates the coupling element 4 installed in a household appliance, e.g. a steam oven. The coupling element 4 provides a liquid connection between the liquid port 3 which is in the current embodiment arranged at or close to the control dashboard and the liquid receiving entity 2, e.g. a liquid tank. The liquid receiving entity 2 comprises at the upper side a connection portion, at which a free end of the coupling element 4 is mounted. The coupling element 4 extends with a U-shaped loop at the upper side of the liquid receiving entity 2. In other words, the coupling element 4 is at least partially supported by the upper surface of the liquid receiving entity 2. As already described before, the coupling element 4 may comprise contact surfaces, for example built by said rib structure 6 and/or other contact portions, which may provide a slanted arrangement of the coupling element 4 in order to ensure that liquid is steadily running from the liquid port 3 to the liquid receiving entity 2. In other words, based on the contact surfaces, a slope of the coupling element 4 relative to the upper surface of the liquid receiving entity 2 is achieved.

The liquid receiving entity 2 may further comprise fixation means for fixing the coupling element 4 at its upper portion. Said fixation means may be, for example, clips, pins etc.

The coupling element 4 may be a plastic or rubber pipe which may be a single piece pipe or may comprise multiple sections which are coupled with each other in order to build the coupling element 4.

It should be noted that the description and drawings merely illustrate the principles of the proposed household appliance. Those skilled in the art will be able to implement various arrangements that, although not explicitly described or shown herein, embody the principles of the invention.

LIST OF REFERENCE NUMERALS 1 household appliance
2 liquid receiving entity 2.1 upper surface
3 liquid port
4 coupling element
4a first coupling portion
4b second coupling portion
4.1 first leg portion
4.2 second leg portion
4.3 curved portion
5 stiffening means
6 rib structure
6.1 free end portion
7 fixing portion
8 mounting portion
9 collar
FD flow direction

The invention claimed is:

1. A household appliance comprising a liquid receiving entity for storing liquid, a liquid port for supplying liquid to the liquid receiving entity and a coupling element adapted to provide a liquid connection between the liquid receiving entity and the liquid port, the coupling element comprising a U-shaped or essentially U-shaped segment having a first leg portion, a second leg portion and a curved portion connecting the first and the second leg portions, wherein said segment comprises at least one flexible section, wherein at least one said leg portion comprises stiffening means for stiffening the at least one said leg portion, and wherein said stiffening means define a predetermined inclination of the coupling element with respect to a horizontal plane.

2. The household appliance according to claim 1, wherein said stiffening means comprise a rib structure.

3. The household appliance according to claim 2, wherein said rib structure extends in a flow direction along the coupling element.

4. The household appliance according to claim 2, wherein said rib structure extends downwardly from said coupling element.

5. The household appliance according to claim 1, wherein said stiffening means are adapted to define portions with increased rigidity.

6. A household appliance comprising a liquid receiving entity for storing liquid, a liquid port for supplying liquid to the liquid receiving entity and a coupling element adapted to provide a liquid connection between the liquid receiving entity and the liquid port, the coupling element comprising a U-shaped or essentially U-shaped segment having a first leg portion, a second leg portion and a curved portion connecting the first and the second leg portions, wherein said segment comprises at least one flexible section, wherein at least one said leg portion comprises stiffening means for stiffening the at least one said leg portion, and wherein the coupling element is adapted to rest on the liquid receiving entity via the stiffening means, wherein said stiffening means ensure a predetermined angle of inclination of the coupling element with respect to an upper surface of the liquid receiving entity.

7. The household appliance according to claim 1, wherein the coupling element comprises a fixing portion adapted to interact with a corresponding mounting portion of the household appliance.

8. The household appliance according to claim 7, wherein the fixing portion radially protrudes from a leg portion of the coupling element.

9. The household appliance according to claim 1, wherein the curved portion comprises a rib structure for increased rigidity of the curved portion.

10. The household appliance according to claim 1, wherein the coupling element comprises one or more connection portions adapted to fix the coupling element at an upper surface of the liquid receiving entity.

11. The household appliance according to claim 1, wherein the at least one flexible section is adapted to provide a hinge portion and said stiffening means specify portions with increased rigidity thereby defining a specific deformation pattern when deforming the coupling element.

12. The household appliance according to claim 1, wherein the coupling element is adapted to recover into a predetermined shape after deformation.

13. The household appliance according to claim 1, wherein the liquid receiving entity is a liquid tank.

14. The household appliance according to claim 1, being configured as a steam oven.

15. A steam oven comprising a liquid port, a liquid tank and a coupling element that couples said liquid port with said tank in order to provide fluid communication therebetween; said coupling element comprising a first leg, a second leg and a curved section therebetween; said first leg comprising a first coupling portion that connects the coupling element to the liquid port and said second leg comprising a second coupling portion that connects the coupling element to the liquid tank; at least a portion of said second leg being an elastically flexible section of said coupling element adapted to deflect on application of a deflecting force on installation of the coupling element into said steam oven in order to aid the installation thereof, and then to return to a resting, straight configuration after said deflecting force is removed following said installation; a first rib extending in a flow direction along a length of said first leg and adapted to stiffen said first leg in a straight configuration; said first leg resting on an upper surface of said liquid tank via said rib; said rib having a variable height such that said first leg resting on said upper surface of said tank slopes downward in the flow direction from said port toward said tank to ensure a smooth liquid flow in said flow direction and to minimize liquid stagnation in said coupling element during use.

16. The steam oven according to claim 15, said coupling element further comprising a collar extending radially from said first leg adjacent to said first coupling portion thereof, said first leg passing through an opening in a wall or panel of the steam oven; said collar having a larger diameter than said opening such that said collar acts as a stop abutting against a portion of said wall or panel surrounding said opening upon insertion of said first leg through said opening during said installation in order to fix a position of said first leg in said steam oven.

17. The steam oven according to claim 16, said first leg being longer than said second leg.

18. The steam oven according to claim 16, said flexible section of said coupling element comprising stiffening means that provide one or more portions thereof with increased rigidity relative to a remainder of said flexible section, thereby defining a specific deformation pattern of said flexible section when deforming the coupling element on installation thereof.

* * * * *